Dec. 9, 1958     W. S. BOYLE ET AL     2,864,054

VELOCITY MEASUREMENT OF RELAY CONTACTS

Filed March 19, 1957

INVENTORS    W. S. BOYLE
J. L. SMITH

Martha H. Pugh

AGENT

2,864,054
Patented Dec. 9, 1958

2,864,054

VELOCITY MEASUREMENT OF RELAY CONTACTS

Willard S. Boyle, Berkeley Heights, and James L. Smith, Basking Ridge, N. J., assignors to Bell Telephone Laboratories, Incorporated, New York, N. Y., a corporation of New York Application March 19, 1957, Serial No. 647,148

9 Claims. (Cl. 324—28)

This invention relates in general to velocity measurement, and, more particularly, to techniques and apparatus for measuring the rate of closure of contact members.

The welding of metal contacts to wire-spring relays and the welding of wires to terminals to within small tolerances has required more precise welding techniques than heretofore available. This has led to the development of a capacitor-discharge, percussion-type welder, capable of individually welding each of the metal contacts to the corresponding wire armature of a relay under construction. The percussion welding process consists of utilizing a charge storage circuit to maintain a voltage across the two parts to be welded. One of the parts is clamped to a mechanical appendage, the "gun," which is rapidly propelled toward the other, stationary part. At a given separation between the parts, an arc discharge is initiated across the gap, thereby heating the opposing surfaces, and causing the formation of a thin layer of molten metal on both parts. The parts are rapidly brought into contact, finally extinguishing the arc discharge.

The velocity of approach of the two parts to be welded is an important factor in establishing the quality of the weld, since it determines the kinetic energy of the impact between the welded parts, and the duration of the welding arc discharge.

The velocity of contact closure is also an important criterion of the behavior of wire-spring relays made by the foregoing process, and of other types of relays, inasmuch as it affects, among other things, the impact at closure, the overall alignment of the relay, and the consequent chatter of the relay elements.

In accordance with prior techniques, measurements of velocity in the immediate area of contact closure were made with considerable difficulty. This is due to the fact that such velocity measurements involve accurately measuring the space interval traversed by the closing contacts from the exact point at which time measurement is initiated. Moreover, in order to approximate the instantaneous velocity at closure, the measured space interval must necessarily be small, and is accordingly difficult to determine with the requisite degree of precision.

Accordingly, it is a principal object of the present invention to provide a new technique for measuring velocity, and more particularly, for measuring the velocity of closure of a pair of contacting members over a relatively minute, controllable space interval.

In accordance with the present invention, the foregoing object is achieved by impressing a preselected voltage of sufficient magnitude to cause an arc discharge across the air gap intervening between a pair of contacting members under test, prior to closure; and utilizing the resultant current surge to trigger a cathode ray oscilloscope to measure the time which elapses before actual closure takes place. Inasmuch as the breakdown gap-length corresponding to a preselected impressed voltage is known from Paschen's law, the velocity of closure of the contacts can be readily calculated; and accordingly, the scale on the oscilloscope screen may be calibrated in terms of the velocity as a dual function of the impressed breakdown voltage, and of the time elapsing between initiation of the arc discharge contact closure. Irradiation of the gap between the contacting members with ultraviolet light insures reproducibility of the breakdown point.

A preferred embodiment of the invention includes a charge-storage circuit which recharges with a time constant which is long compared with the time of closure of the contacting members. Initial discharge of the charge-storage circuit takes place upon occurrence of the arc discharge, which is of short duration relative to the above time constant. The charge-storage circuit then slowly recharges, again discharging upon actual engagement of the test contacts.

This technique has been found to be especially applicable to velocity measurements of the types indicated in the early paragraphs of the specification, particularly in relation to the precise adjustment of the velocity of the "gun" utilized in percussion welding equipment, and performance tests applied to wire-spring relays. Frequent velocity tests of percussion welding equipment in accordance with the technique of the present invention have been instrumental in securing high quality welds. Moreover, it is anticipated that velocity measurements in accordance with the present inventive techniques can also lead to significant improvements in the adjustment and operation of a number of different types of relays, including particularly wire-spring relays.

A study of the detailed specification hereinafter, and the attached drawings, will reveal additional features and advantages to be derived from using the velocity measuring techniques and apparatus of the present invention. Moreover, in addition to the specific applications of this invention described hereinafter by way of example, numerous others will readily occur to those skilled in the art.

It is well known, in accordance with the discovery of Friedrich Paschen in 1877, that the voltage at which an arc discharge is initiated across a gas-filled gap is a substantially smooth function of the product of the gap-length and the gas pressure. In accordance with the present invention, the foregoing relationship is utilized as a basis for measuring the velocity of closure of a pair of contacting elements.

Consider the case in which a voltage $V_b$ is applied across a pair of contacts prior to closure; and that an arc discharge is initiated in the intervening air gap. Accordingly, if the pressure is constant, the gap-length $d$, at which the discharge is initiated, can readily be determined from Paschen's law. After the initial discharge, the contacts continue to close until metallic engagement occurs. The time lapse $\tau$ between the instant of discharge and actual closure of the contacts is measured on the screen of an oscilloscope having beam deflecting means which is responsive to elapsed time and to the variations in voltage across the test contacts. The velocity is then readily determined in terms of the elapsed time, and the impressed breakdown voltage, which is a known function of the separation between the contacts at breakdown.

Figure 1:
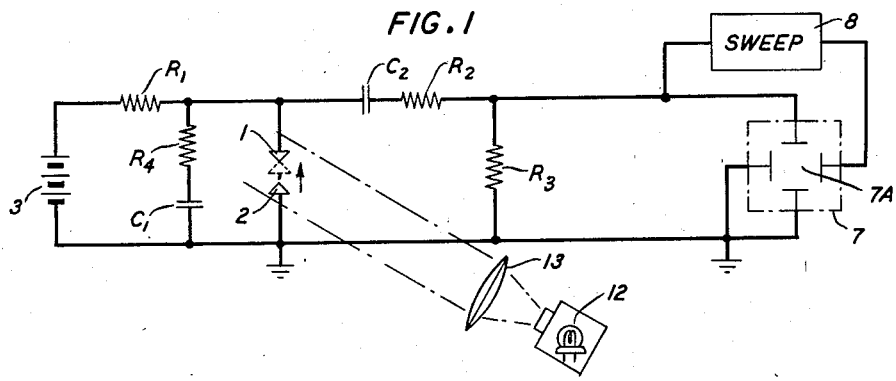
Fig. 1 is the schematic circuit arrangement of a preferred form of test unit in accordance with the present invention.

A preferred circuit, in accordance with the present invention, for measuring the velocity of closing contacts in the manner indicated in the foregoing paragraph, is shown schematically in Fig. 1 of the drawings. Referring in detail to Fig. 1, reference numerals 1 and 2 indicate a pair of contacts which are subject to test. These may comprise, for example, the elements to be welded in a percussion welding process, or alternatively, a pair of relay contacts of any of the types well known in the art. Illustrative examples of structures adapted for velocity measurements in accordance with the present invention will be described in greater detail hereinafter.

A circuit is provided for impressing a fixed potential across the contacts 1 and 2. This includes a capacitor $C_1$ of, for example, .01 microfarad, and a damping resistor $R_4$, of 15 ohms, connected in series directly across contacts 1 and 2 so that the gap between the latter is included in the discharge path of the capacitor. A circuit for charging capacitor $C_1$ includes a potential source 3 of fixed potential of about 1500 volts, the high potential terminal of which is connected to contact 1 through a resistance $R_1$ of about 10 megohms, and the low potential terminal of which is connected directly to grounded contact 2.

Figure 2:
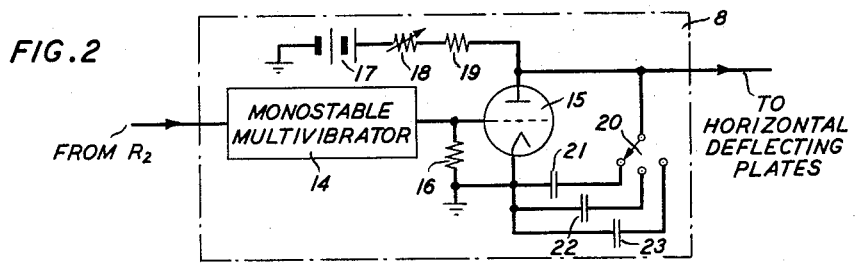
Fig. 2 is an alternative circuit configuration for the sweep circuit 8 of Fig. 1, whereby the indication on screen 7a can be read directly in terms of velocities.

A circuit for recording the time elapsing between the initial and final discharges of capacitor $C_1$ is also connected, in combination with the foregoing elements, across the contacts 1 and 2. This includes a conventional cathode-ray oscilloscope 7, comprising a source of a beam of electrons directed to impinge on a fluorescent screen 7a, the motion of the beam on the screen being controlled by conventional horizontal and vertical deflecting means. A sweep circuit 8 is connected across the horizontal deflecting means of oscilloscope 7, and is designed to move the beam across the screen 7a in a horizontal direction, such that the horizontal displacement on the screen is directly proportional to elapsed time from the instant at which the motion is initiated at the left-hand side of the screen. The sweep circuit 8 may be of conventional form or, alternatively, may assume a slightly modified form such as indicated in Fig. 2, which will be discussed in detail hereinafter. The vertical deflecting means of oscilloscope 7 is connected to move the beam vertically on the screen in response to variations in magnitude of the voltages across the contacts 1 and 2. With modifications to the horizontal sweep circuit such as indicated in Fig. 2, the horizontal scale on the screen 7a can be calibrated to read velocity directly as a dual function of elapsed time, and of the voltage applied to initiate an arc discharge across contacts 1 and 2.

Contacts 1 and 2 are connected across the vertical deflecting circuits of oscilloscope 7 through a potential dividing circuit consisting of a series resistor $R_2$ of 10 megohms, and a shunt resistor $R_3$ of .1 megohm, so chosen that the ratio of the voltage appearing across the deflecting circuits of oscilloscope 7 is of the order of one one-hundredth of the voltage across resistor $R_2$. Interposed in series with resistor $R_2$ is a blocking capacitor $C_2$ having a capacitance of about .001 microfarad, which serves to keep direct current out of resistors $R_2$ and $R_3$. The voltage output across resistor $R_3$ is impressed on a pair of parallel circuits, one of which serves to trigger operation of the time-dependent sweep circuit 8, connected to the horizontal deflecting means of oscilloscope 7, and the other of which is coupled directly to the vertical deflecting means. Hence, the path executed by the beam on the screen 7a varies horizontally with time, and vertically with the voltage across resistor $R_3$.

In order to stimulate the recurrence of the arc discharge at the same point each time in the air gap between contacts 1 and 2, a beam of ultraviolet light from a source 12 is focused on the gap between the contacts, and especially on the cathode contact 2 by means of, for example, a quartz bus 13, or alternatively an aluminum mirror, thereby causing the release of photoelectrons into the gap, which serve to trigger the breakdown and thereby prevent false readings which might otherwise occur.

In the present illustrative embodiment, the illuminating source 12 may take the form of a 4-watt ozone lamp, such as manufactured, for example, by the General Electric Company, and which is operated in a 50-volt circuit with a ballast resistor of 100 ohms. Direct current is used to keep the illumination constant. The sufficiency of the illumination for the purposes of the present invention is easily determined by observing on the screen 7a of oscilloscope 7 the time lapses preceding successive closures, which vary widely when no illumination is directed on the contacts, but which become substantially constant when the illumination is sufficient and of the correct type. When using an ultraviolet lamp of the type indicated, it has been found advisable to wear special glasses to protect the eyes.

It will be apparent to those skilled in the art that whereas ultraviolet light is preferred for the purposes of the present invention, other types of radiation may be substituted, such as, for example, gamma rays, or alpha particles, or any other type which provides energy of a requisite character to provide an initiating electron for the discharge.

The circuit of Fig. 1 described in the foregoing paragraphs is designed to operate in the following manner. Before the gap between the contacts 1 and 2 becomes conducting, both capacitors $C_1$ and $C_2$ are charged to a pre-set voltage such that no current is flowing through the resistor $R_3$. When current breakdown occurs in the gap, the capacitor $C_1$ rapidly discharges nearly completely, whereupon capacitor $C_2$ also starts to discharge, causing transient current to flow through the resistance element $R_3$, thereby triggering operation of the sweep circuit 8 connected to the horizontal deflecting means of the oscilloscope 7. The resistor $R_4$ functions to heavily damp oscillations in the circuit of capacitor $C_1$, causing the latter to discharge to about the same potential each time. After the initial discharge, capacitor $C_1$ again charges up at a slow rate under control of the discharge of capacitor $C_2$, so that the charge stored by capacitor $C_1$ prior to actual closure is only a small fraction of the charge initially stored, and well below that required for a recurrence of the arc discharge across the gap.

Figure 3:
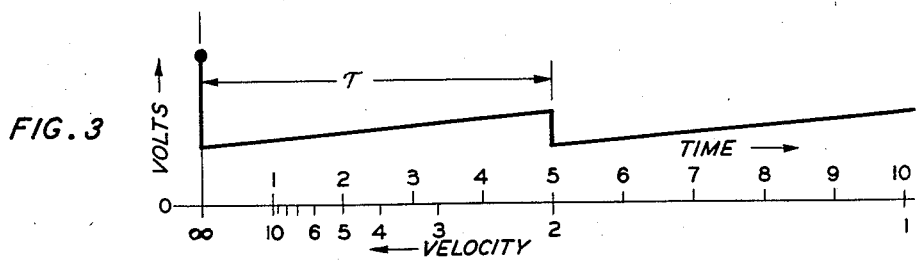
Fig. 3 is a typical pattern appearing on the oscilloscope screen in the circuit of Fig. 1.

Upon actual closure of the contacts 1 and 2, the capacitor $C_1$ discharges again, producing a drop in the voltage across resistors $R_2$ and $R_3$ which causes a sharp reduction in the voltage across the vertical deflecting plates of oscilloscope 7, thereby producing a discontinuity in the trace on the screen 7a, as indicated in Fig. 3. The latter shows a plot of the voltage across resistor $R_3$ as a function of time, a step in the voltage across resistor $R_3$ being proportioned to a step in the voltage across contacts 1 and 2. Hence, the time elapsing from the initial discharge to actual closure of the contacts 1 and 2 is readily observable. After closure has taken place, as indicated in Fig. 3, the trace on the oscilloscope again rises slowly on account of the gradual discharge of the blocking capacitor $C_2$.

Figure 4:
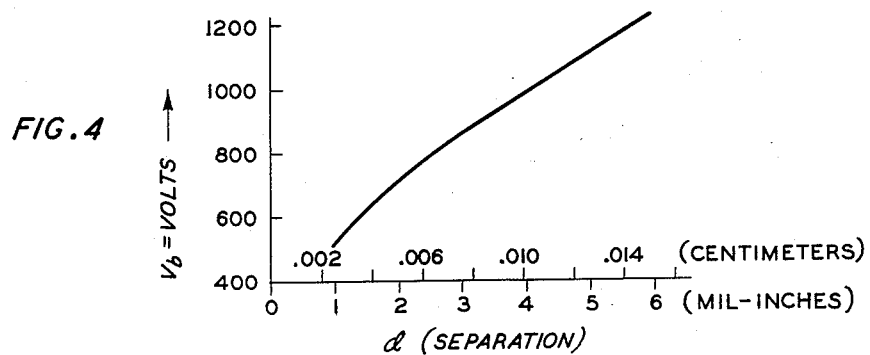
Fig. 4 is a graph, in accordance with Paschen's law, for calibrating the apparatus of the present invention.

Inasmuch as variations in the ambient atmospheric pressure are relatively slight, measurements made under ordinary atmospheric conditions are considered sufficiently accurate for the purposes of the present invention. Hence, the form of Paschen's curve which is most useful for present purposes is a plot of breakdown voltage $V_b$ versus gap-length $d$ in terms of centimeters and mils, at a pressure of 760 millimeters of mercury, which corresponds to ordinary atmospheric pressure. This is shown in Fig. 4 of the drawings.

The oscilloscope screen 7a, on which horizontal displacement represents time, may be calibrated in terms of approach velocity $v$, so that the interval measured on the scale represents velocity as a known function of the applied breakdown voltage $V_b$, and of the time elapsing between initiation of the arc discharge and contact closure. This follows, since:

$$v = \frac{d}{\tau}$$

where $\tau$ represents elapsed time between initiation of the arc discharge and contact closure; and $$d = f(V_b)$$

from Paschen's law, hence $$v = \frac{f(V_b)}{\tau} \quad (1)$$

It is apparent that if circuit parameters are so chosen that operation takes place over a substantially restricted, linear portion of Paschen's curve, Equation 1 simplifies to:

$$v = \frac{kV_b + C}{\tau} \quad (2)$$

where $k$ and $C$ are calibration constants which can be readily determined for a given set of circuit conditions. If a fixed value is selected for $V_b$, then the velocity $v$ of the approaching contacts varies inversely as the elapsed time $\tau$.

The screen 7a of oscilloscope 7 can be calibrated in terms of the velocity of approach of contacts 1 and 2 by making use of the foregoing relationship 2.

It is first necessary, however, to impose a slight modification on the conventional cathode-ray sweep circuit, whereby the horizontal sweep frequency can be varied in terms of the selected breakdown voltage. A simple circuit for achieving this is shown in Fig. 2 of the drawings, which may be substituted for the conventional sweep circuit 8 in the circuit schematic of Fig. 1 of the drawings.

Referring to Fig. 2, a conventional monostable multivibrator 14 is connected to the junction between resistors $R_2$ and $R_3$ of the circuit of Fig. 1, in circuit relation to be triggered by the arc discharge across contacts 1 and 2. Multivibrator 14 is designed to deliver a negative gating pulse to the grid of triode 15, large enough to reduce the potential of the latter below cut-off. The grid of triode 15 is connected to ground through the 1 megohm grid-resistor 16, and the cathode is grounded directly. The plate of the triode 15 is energized from a positive direct-current source 17 through variable calibrating resistor 18, which traverses a scale of values to be presently discussed in detail, and the 38,000 ohm resistor 19. The plate of triode 15 is directly connected to the armature of a three-way switch 20, the three alternative contacting positions of which are connected to three capacitors 21, 22 and 23 having respectively different values of capacitance which will be described presently. The junction between the resistor 19 and switch 20 is connected to the horizontal deflecting plates of the cathode-ray oscilloscope 7 of Fig. 1.

It is contemplated that settings of the variable resistor 18, the capacitors 21, 22, and 23, and the monostable multivibrator 14 can be controlled manually by calibrated knobs on the oscilloscope 7.

For example, the resistor is variable over the range zero to 113,000 ohms, and may be calibrated in the manner set forth in Table I below.

In order to scale the deflection on the oscilloscope screen 7a in accordance with an anticipated range of velocity values, switch 20 is manually adjustable to select the appropriate one of capacitors 21, 22, or 23, and the corresponding setting of multivibrator 14 to provide a negative gating pulse of the proper duration.

Table II below indicates appropriate settings for full-scale deflection in accordance with three different velocity scales, corresponding to fine, medium, or coarse adjustment.

*Table II*

| Approach Velocity | 1 cm./sec. | 10 cm./sec. | 100 cm./sec. |
|---|---|---|---|
| Capacitance (farads) | $10^{-7}$ | $10^{-8}$ | $10^{-9}$ |
| Gating Pulse (microseconds) | 20,000 | 2,000 | 200 |

Accordingly, since the approach velocity varies as a reciprocal of elapsed time, the scale on screen 7a is calibrated in values from 1 to 10, beginning with 1 at the right-hand end of the screen, the spacing between successive digits from right to left varying as their reciprocals. Thus, the velocity is read in units of centimeters per second, decimeters per second, or meters per second, depending on whether the switch 20 and pulse generator 14 are set for fine, medium, or coarse adjustment. A similar scale may be set up to measure the approach velocities in mils per second.

Assuming switch 20 to be closed to one of the positions indicated, and variable resistor 18 and the monostable multivibrator 14 to be adjusted to their proper settings, the selected capacitor 21, 22, or 23 is charged up from the source 17 at a preselected rate, during the interval in which the triode 15 is cut off by the negative pulse from monostable multivibrator 14, the latter having been triggered by the arc discharge across contacts 1 and 2. It is apparent that the charging rate of the selected capacitor is a function of the plate circuit resistance, including variable resistor 18. At the end of the negative pulse from the multivibrator 14, triode 15 becomes conducting, and the selected capacitor 21, 22, or 23 discharges. Throughout the foregoing cycle, the voltage output from the plate of triode 15 is impressed across the horizontal deflecting plates of oscilloscope 7, thereby controlling the horizontal motion of the beam on screen 7a. Accordingly, the horizontal extent of the measured interval on screen 7a is directly proportional to elapsed time. Also, assuming the circuit arrangement described in the foregoing paragraph, the measured interval may be made to vary inversely as $V_b + C$, in accordance with the setting of biasing resistor 18. Thus, velocity as indicated on the scale of screen 7a varies inversely as the measured horizontal interval.

It has been found that the shape of the contacts serving as electrodes for the arc discharge is not particularly critical, provided that the discharge, in each incidence, take place across the gap between the two most closely adjacent points on the respective electrodes; and the radii of curvature of the opposing surfaces are large compared to their separation.

Several other considerations, however, are important in the design of circuits for measuring contact closure velocities in accordance with the present invention.

*Table I*

| Breakdown Potential (volts) | 600 | 700 | 800 | 900 | 1,000 | 1,100 | 1,200 |
|---|---|---|---|---|---|---|---|
| Breakdown Contact Separation: | | | | | | | |
| (cm.) | .0038 | .0051 | .0066 | .0086 | .0108 | .0130 | .0151 |
| mils | 1.5 | 2 | 2.5 | 3.4 | 4.25 | 5.1 | 6 |
| Resistance (ohms) | 0 | 13,000 | 28,000 | 48,000 | 70,000 | 92,000 | 113,000 |

The breakdown gap-length $d$ is preferably chosen to be small enough (of the order of a few mils) so that the velocity changes only minutely during the measured interval. The measurement thus made approximates the instantaneous velocity at the point of closure, rather than the average velocity over a relatively extended space interval.

The parameters of the circuit, particularly the time constants of the circuits including capacitors $C_1$ and $C_2$ and their associated resistors should be so chosen that the initial discharge across the breakdown gap is small enough so as not to damage the test contacts in a manner that appreciably changes the gap-length. Otherwise, the time measured will be for a different gap-length than that at which the breakdown initially occurs. This factor is substantially eliminated by allowing the electrodes to discharge only a small capacity, of the order of .01 microfarad. The mound-height raised on the cathode for a discharge of this order of magnitude, even under adverse conditions, is only about 3 percent of the gap-length. Accordingly, this limits the magnitude of capacitor $C_1$ to one having a capacitance of .01 microfarad or less.

Although it is desirable that the second discharge, which occurs at the time of actual closure of the contacts, have sufficient magnitude to show well on the screen, nevertheless the recharging of capacitor $C_1$ after the initial discharge must be slow enough so that a second discharge does not occur prior to actual closure.

Accordingly, the circuit is so designed that after the initial discharge, capacitor $C_1$ is charged up again under control of capacitor $C_2$.

Referring to the salient parameters indicated in the circuit of Fig. 1, the following criteria are set up as rough guides to the selection of suitable time-constants for the discharge circuits.

$$R_1 C_1 \gg \frac{d}{v} \qquad (3)$$

where $d$ = the breakdown gap-length between contacts 1 and 2 and $v$ = the average velocity of closure of the space interval $d$.

Consider the case in which the velocity of closure $v$ of contacts 1 and 2 is of the order of 40 cm. per second. If 960 volts is chosen as a typical voltage for application across contacts 1 and 2, the breakdown gap-length, as determined from Paschen's curve in Fig. 4, is .01 cm. Then $$\tau = \frac{d}{v}$$

the time elapsing between initial breakdown and closure, is of the order of $2.5 \times 10^{-4}$ seconds.

Accordingly, substituting the parameters of the present illustrative embodiment, $R_1 = 10^7$ ohms, and $C_1 = 10^{-8}$ farads, it is seen that in expression 3 the foregoing criterion is met.

$$R_1 C_1 = 10^7 \times 10^{-8} \gg 2.5 \times 10^{-4} \qquad (4)$$

or $$10^{-1} \gg 2.5 \times 10^{-4}$$

Moreover, the following considerations will indicate whether the discharge which takes place at the instant of contact closure is of sufficient magnitude to produce a readable indication on the oscilloscope screen $7a$.

Consider the case in which the initial breakdown voltage $V_b$ across contacts 1 and 2 is 960 volts. Upon initiation of the arc discharge, this immediately drops to a low constant voltage $V_a$ of, for example, 14 volts. Then the drop in voltage of contact 1 with respect to contact 2, which takes place upon initiation of the arc discharge, is 946 volts.

The following equation approximately indicates the voltage $V_1$ appearing on the oscilloscope screen at the instant of the initial discharge.

$$V_1 \cong \frac{-(V_b - V_a) R_3}{R_2} \qquad (5)$$

where Fig. 1 shows the relative circuit positions of parameters $R_2$ and $R_3$. (In order to protect the oscilloscope circuits, $R_2$ should be substantially larger than $R_3$, e. g., of the order of 100 to 1.)

Substituting the circuit values of the present illustrative embodiment in Equation 5:

$$V_1 \cong \frac{-(970 - 14) 10^5}{10^7}$$

$$V_1 \cong 9 \text{ volts} \qquad (6)$$

At the instant of closure, the voltage $V_c$ across the contacts 1 and 2 only slightly exceeds the voltage across the arc, that is, if the capacitance $C_2$ of the blocking condenser is much smaller than the capacitance of condenser $C_1$, as in the present illustrative embodiment.

Hence, the voltage drop $V_2$, appearing across the oscilloscope 7, can be computed very simply from the following equation:

$$V_2 \cong -V_c \frac{R_3}{(R_2 + R_3)} \qquad (7)$$

If $V_c$ is assumed to be about 14 volts, as in the embodiment illustrated, then:

$$V_2 \cong -.14 \text{ volt} \qquad (8)$$

From the foregoing, it is seen that if the circuit parameters are as indicated for the present illustrative embodiment, the trace on the oscilloscope screen $7a$ will indicate the instant of contact closure by a small vertical drop.

It will be apparent to those skilled in the art that the foregoing computations are intended to illustrate the manner in which the circuit parameters may be evaluated in accordance with the present invention for a given set of conditions; and that under appreciably different conditions of voltage breakdown and/or approach velocity, the actual circuit parameters would, of course, be different. Accordingly, the gap-length $d$, the resistances $R_1$, $R_4$, $R_2$, and $R_3$, and the capacitances $C_1$ and $C_2$ are all varied to suit the requirements of each specific case, keeping in mind the limitations mentioned.

Moreover, although as a matter of convenience $C_2$ has been made appreciably smaller than $C_1$ in the present illustrative embodiment, it is not necessary to impose any limitations on the value of $C_2$ other than those already discussed with reference to $C_1$.

As previously pointed out, the techniques and apparatus of the present invention are applicable to velocity measurements on any of the various types of mechanical structures comprising a pair of metallic members which move repetitively from an open position to one of closed metallic engagement.

For example, the technique of the present invention is particularly suited to measuring the velocity of approach of the parts to be welded by a percussion welding process such as described in detail, for example, in an article by E. E. Sumner entitled "Some Fundamental Problems in Percussion Welding," Bell System Technical Journal, vol. 33, No. 4, page 885, July 1954.

Moreover, the technique and apparatus of the present invention can likewise be readily applied to the measurement of the velocity of closure of wire-spring relay contacts of the form described in detail in an article entitled "A New Multicontact Relay for Telephone Switching Systems," by I. S. Rafuse, Bell System Technical Journal, vol. 33, No. 5, page 1111, September 1954.

In addition to the applications specifically referred to, the present invention is adapted to numerous different applications and circuit modifications within the scope

What is claimed is:

1. A system for measuring the velocity of approach of a pair of metal members from positions spaced apart to a position of metallic contact, which comprises in combination a capacitor connectable to said metal members so that the air gap between said members is in the discharge path of said capacitor, means including a source of substantially fixed potential for charging said capacitor to a preselected voltage at which an arc discharge is initiated at a preselected separation of said members, a source of a beam of radiant energy focused on said members and the included air gap simultaneously with said arc discharge, and means comprising a time-recording circuit connectable to said metal members in combination with said capacitor, said time-recording circuit including means responsive to the step in current resulting from said initial arc discharge across said air gap to initiate the measurement of a time interval, and means responsive to a second step in the discharge current of said capacitor upon actual contact of said metallic members to terminate the measurement of said time interval.

2. A circuit in accordance with claim 1 wherein the time constant of said capacitor is of an order of magnitude which substantially exceeds the order of magnitude of said measured time interval.

3. A system for measuring the velocity of approach of the terminal portions of a pair of metallic members from positions spaced apart to a position of metallic contact, which comprises in combination a capacitor adapted to be connected to said metallic members so that the air gap between said terminal portions is in the discharge path of said capacitor, means including a source of substantially fixed potential and a high-resistance interconnecting circuit for charging said capacitor to a preselected voltage sufficient to initiate an arc discharge across said air gap at a preselected separation of said members, a source of a beam of ultraviolet light focused on the terminal portions of said metallic members and said intervening gap simultaneously with said arc discharge, and means comprising a cathode-ray oscilloscope including a luminescent screen, a source of a beam of electrons directed against said screen, and deflecting means including a sweep circuit for moving said beam to traverse a horizontal path on said screen which is a function of elapsed time, said deflecting means adapted to be coupled across said contacts in combination with said capacitor and responsive to said initial arc discharge across said air gap to initiate measurement of a space interval along said horizontal path, and to a second current discharge of said capacitor upon metallic contact of said terminal portions to terminate measurement of said space interval along said horizontal path, and means for adjusting the sweep voltage of said oscilloscope so that said interval on said horizontal path varies in accordance with said preselected voltage, whereby said interval is a measure of the approach velocity of said members.

4. A circuit in accordance with claim 3 wherein the time constant of said capacitor in series with said high resistance circuit is of an order of magnitude to substantially exceed the elapsed time between said initial arc discharge and said second current discharge.

5. A circuit in accordance with claim 3 wherein a blocking capacitor is interposed between the high potential terminal of said first-named capacitor and the deflecting means of said oscilloscope, and wherein a potential dividing circuit is interposed across the input terminals of said deflecting means.

6. A test circuit for measuring the velocity at which a pair of metallic contact arms move from open to closed contact position, which comprises in combination a source of ultraviolet radiation for irradiating a portion of said contact arms and the intervening air gap, a capacitor connectable across said contact arms simultaneously with irradiation of said contact arms by said source of ultraviolet radiation, a source of substantially fixed potential and a high resistance element connected in circuit relation to said capacitor for charging said capacitor to a preselected potential which corresponds to the breakdown potential across said air gap at a preselected position between said open and closed contact positions, a cathode-ray oscilloscope having a luminescent screen, a source of a beam of electrons directed against said screen, and deflecting means including a sweep circuit for moving said beam to traverse a path on said screen which is a function of elapsed time, said deflecting means connectable to said contacts in combination with said capacitor, and responsive to an initial discharge of said capacitor across said air gap to initiate indication of a measured interval along said path on said screen, and to a subsequent current discharge of said capacitor to terminate indication of said measured interval along said path.

7. A combination in accordance with claim 6 wherein a blocking capacitor and series resistor are interposed between said cathode-ray deflecting circuit and the high-potential terminal of said first capacitor, and wherein resistance of at least critical damping magnitude is connected in the discharge path of said first capacitor.

8. A combination in accordance with claim 6 including means for varying the time constant of said sweep circuit in accordance with said preselected potential, whereby the said measured interval on said screen is a measure of velocity, said screen including calibrations in terms of the velocity of approach of said contact arms.

9. In combination with a percussion welding unit, means for measuring the velocity of approach of a pair of elements to be welded, which comprises in combination a beam of ultraviolet light disposed to irradiate the terminal portions of said elements and the air gap intervening between said terminal portions, a capacitor connectable between said elements simultaneously with irradiation by said ultraviolet beam, and in a manner to include said gap in the discharge path of said capacitor, means including a high fixed potential source and high resistance means connected in circuit relation to said capacitor to charge said capacitor to a preselected potential which corresponds to the current-breakdown potential at a preselected point in said air-gap, and recording means comprising a cathode-ray oscilloscope having a deflecting circuit connected in circuit relation with said capacitor, and responsive to an initial discharge of said capacitor across said air gap to initiate the measurement of a space interval on said screen which varies as a function of elapsed time, and to a second discharge of said capacitor upon metallic contact between the terminal portions of said elements to terminate said measured space interval, and means connected to said deflecting means for also varying said measured space interval on said screen as a function of said preselected potential, said recording means being calibrated to indicate the velocity of approach of said elements to be welded.

References Cited in the file of this patent

UNITED STATES PATENTS

| | | |
|---|---|---|
| 1,986,607 | Skeats | Jan. 1, 1935 |
| 2,310,747 | Payne | Feb. 9, 1943 |